United States Patent [19]

Trojan

[11] Patent Number: 5,898,059
[45] Date of Patent: Apr. 27, 1999

[54] PRODUCTION OF POLYETHYLENE TEREPHTHALATE

[75] Inventor: Kathleen L. Trojan, Greenville, S.C.

[73] Assignee: Hoechst Diafoil Company, Greer, S.C.

[21] Appl. No.: 09/026,278

[22] Filed: Feb. 19, 1998

[30] Foreign Application Priority Data

Mar. 14, 1997 [GB] United Kingdom ................. 97104358

[51] Int. Cl.$^6$ .................................................. C08G 64/00
[52] U.S. Cl. ........................................... 528/272; 528/271
[58] Field of Search ..................................... 528/271, 272

[56] References Cited

U.S. PATENT DOCUMENTS

| | | | |
|---|---|---|---|
| 3,907,754 | 9/1975 | Tershansy et al. ..................... | 260/75 R |
| 4,010,145 | 3/1977 | Russin et al. .......................... | 260/75 R |
| 4,122,107 | 10/1978 | Kenney ................................. | 260/429.3 |
| 5,153,164 | 10/1992 | Mason ..................................... | 502/324 |

FOREIGN PATENT DOCUMENTS 0699 700 A2  3/1996  European Pat. Off. ........ C08G 63/82

OTHER PUBLICATIONS

S.G. Hovencamp, "Kinetic Aspects of Catalyzed Reactions in the Formation of Poly(ethylene terephthalate)", *J. polymer Sci.*, Part A–1, vol. 9 (1971).

Primary Examiner—Terressa Mosley
Attorney, Agent, or Firm—Gregory N. Clements

[57] ABSTRACT

Disclosed is a process for the production of polyethylene terephthalate (PET), comprising the steps of (i) reacting di($C_1$–$C_4$)alkyl terephthalate with ethylene glycol to yield bis-(2-hydroxyethyl) terephthalate, (ii) adding a sequestering agent based on phosphorus and (iii) polycondensing the bis-(2-hydroxyethyl) terephthalate to produce PET; wherein in step (i) a zinc catalyst is present and in step (iii) an antimony catalyst is additionally present, the amount of zinc being in the range of from 0.003 to 0.008% by weight (30 to 80 ppm), the amount of phosphorus being in the range of from 0.001 to 0.01% (10 to 100 ppm), and the amount of antimony being in the range of from 0.01 to 0.05% by weight (100 to 500 ppm), in each case such weights being relative to the weight of the di($C_1$–$C_4$)alkyl terephthalate; the molar ratio of the antimony to the zinc being in the range of from 1:0.95 to 1:0.1; and the value, obtained by multiplying the molar ratio of the phosphorus to the zinc by the molar amount of antimony, is 4 or less. The PET produced in the process according to the invention contains a low number of particles, generally less than 400 per microgram, and can be formed into articles having a very smooth surface with only a minimum number of protrusions.

25 Claims, No Drawings

PRODUCTION OF POLYETHYLENE TEREPHTHALATE

FIELD OF THE INVENTION

The present invention relates generally to a process for the production of polyesters and copolyesters by the exchange reaction of a first aromatic dicarboxylic acid diester, or mixture of diesters, with a glycol, or mixture of glycols, in the presence of at least one selected catalyst to yield a second diester or mixture of diesters, and the polymerization of the second diester to yield a polyester or copolyester. In particular, the invention relates to a process for the production of polyethylene terephthalate (PET) comprising, in the order as indicated, the steps of (i) reacting di($C_1$–$C_4$)alkyl terephthalate with ethylene glycol to yield bis-(2-hydroxyethyl) terephthalate, (ii) adding a sequestering agent based on phosphorus and (iii) polycondensing the bis-(2-hydroxyethyl) terephthalate to produce PET. The invention further relates to a PET produced by this process and to shaped articles of this PET. The articles preferably have the form of films which are particularly useful in the production of video tapes.

BACKGROUND OF THE INVENTION

Polyethylene terephthalate is prepared on an industrial scale by one of two processes. The first is the terephthalic acid or TA-process. In this process, terephthalic acid is reacted with ethylene glycol in a direct esterification reaction, producing bis-(2-hydroxyethyl) terephthalate (commonly designated as monomer) and water. The reaction is reversible, hence the water formed during the reaction has to be removed in order to convert the starting materials completely into the monomer. A catalyst is not required in this reaction and conventionally no catalyst is employed. The monomer then undergoes polycondensation to form the PET. In the polycondensation reaction typically antimony catalysts are employed (see e.g. U.S. Pat. No. 5,153,164).

In the dimethyl terephthalate or DMT process, the dimethyl terephthalate is reacted with ethylene glycol at a temperature of between 150 and 250° C. at approximately atmospheric pressure in an ester interchange reaction (transesterification) to yield bis-(2-hydroxyethyl) terephthalate and methanol. The ratio of ethylene glycol to dimethyl terephthalate is in general between 1.4:1 and 2.5:1, preferably between 2.0:1 and 2.5:1. The most typical catalyst employed in the transesterification reaction is a manganese catalyst, specifically manganese acetate. In addition, catalysts based on other metals, such as magnesium, lithium, calcium, cobalt or zinc, may also be used alone or in combination. The transesterification reaction is reversible and the reaction equilibrium can be forced towards the bis-(2-hydroxyethyl) terephthalate only by removing the methanol from the reaction mixture. At the end of the transesterification reaction the activity of the catalyst is sequestered and inactivated by introducing phosphorus. If the catalysts employed in the transesterification reaction are not arrested with phosphorus, the resultant polymer easily degrades upon heating and shows an unacceptable yellow color. For example, this is set forth in the article of S. G. Hovencamp, "Kinetic Aspects of Catalyzed Reactions in the Formation of Poly(ethylene terephthalate)", published in *J. Polymer Sci.*, Part A-1, vol. 9 [1971], pages 3617–3625.

In the second stage of the conventional batch process, the bis-(2-hydroxyethyl) terephthalate is polycondensed and thus converted into PET. Polycondensation is carried out generally at a pressure in the range of from about 0.01 to 40 mm Hg (about 0.01 to 53 mbar) at a temperature in the range of from about 205 to 305° C. The reaction time is about 1 to 4 hours. The catalyst most frequently employed in the polycondensation reaction is a catalyst based on antimony, such as antimony acetate or antimony trioxide. Additives may be added during the process, for example, antiblocking agents, brighteners, bluing agents, color pigments and opaquing agents.

The conventional continuous process is basically an extension of the batch process in which a series of two or more sequentially connected vessels are used to perform the stages of transesterification and polycondensation. In general, a continuous feed of starting materials is used and the methanol formed is removed as the reaction proceeds, thus enabling the reaction to go to completion. The first vessel in the process is generally at atmospheric pressure and the pressure in each successive vessel is decreasing until in the final polycondensation vessel the pressure is generally in the range of from 0.01 to 40 mm Hg (=0.01 to 53 mbar). The temperature through the series of vessels generally increases from about 150 to 290° C. in the first vessel to 200 to 305° C. in the last vessel. The increase in temperature and the decrease in pressure aid in the removal of excess ethylene glycol. The flow of the reactant stream is continuous through each vessel and from vessel to vessel. In addition, the output of PET is continuous. In the continuous process, the same catalysts and sequestering agents can be used as in the batch process.

EP-A 699 700 discloses a process for the production of polyesters from dicarboxylic acid dialkyl esters by (i) transesterification with an aliphatic diol in the presence of a metal catalyst, in particular a manganese catalyst, (ii) adding an agent based on phosphorus which complexes and inactivates the transesterification catalyst, (iii) adding a cobalt compound and (iv) polycondensing the intermediate product in the presence of 1 to 10 ppm of titanium and in the absence of antimony.

U.S. Pat. No. 3,907,754 teaches a process for the production of PET in which the transesterification reaction between dimethyl terephthalate and ethylene glycol is conducted in the presence of a catalytic amount of organic or inorganic salts of manganese and cobalt with acetyl triisopropyl titanate, and subsequently a phosphate ester is added before polycondensation. According to U.S. Pat. No. 4,010,145, an antimony compound is additionally present during the transesterification reaction.

U.S. Pat. No. 4,122,107 discloses a catalyst which is useful both in the transesterification and in the polycondensation step. The catalyst is a bimetallic compound obtained by reacting (1) a first compound selected from the group consisting of antimony(III) salts of monocarboxylic and dicarboxylic acids, antimony(III) and zirconium(IV) alkoxides and antimony trioxide, (2) a second compound selected from the group consisting of zinc, calcium and manganese salts of mono- and/or dicarboxylic acids, and (3) at least a stoichiometric amount of a third compound selected from the group consisting of anhydrides of mono- and dicarboxylic acids, alcohols containing 1 to 20 carbon atoms and glycols containing 2 to 20 carbon atoms. The molar ratio of the trivalent antimony or tetravalent zirconium compound to the manganese, zinc or calcium salt is from 1:1 to 1:6. The catalyst is employed in an amount of 0.01 to 0.3% by weight, based on the weight of the DMT. The PET produced by this process shows a relatively high number of particles or residue produced from the catalyst system. This is a severe disadvantage in many applications.

The problem to be solved is hence to improve the DMT process in order to decrease the number of particles in the PET, and similar polymers, which are produced from the catalyst system. An article produced from the PET accordingly should have a very smooth surface which shows only a minimum number of protrusions.

It is an object of the present invention to provide a process for the production of PET, and similar polymers, starting from di($C_1$–$C_4$)alkyl terephthalates, or similar compounds. These terephthalates, or similar compounds, are reacted with ethylene glycol (EG), or similar glycols, yielding bis-(2-hydroxyethyl) terephthalate, or similar compounds, which is then polycondensed to form PET, or similar polymers.

It is another object of the present invention to provide one or a plurality of shaped articles made of PET, or similar polymers, and in particular to provide a biaxially oriented PET film, or similar polymer film, which shows a significantly reduced number of particles in the polymer matrix and, accordingly, also has a very smooth surface with very few protrusions or other surface imperfections.

SUMMARY OF THE INVENTION

The invention is directed a process for preparing polyesters and copolyesters from aromatic dicarboxylic acid diesters and glycols, and to the polyesters and copolyesters prepared by such a process. In particular, the process is directed to the preparation of polyester by a first step of reacting, in the presence of at least one selected catalyst, a first selected aromatic dicarboxylic acid diester, or a mixture of such selected diesters, in an exchange reaction with a glycol, or mixture of glycols, having a plurality of hydroxyl (—OH) groups to yield a second aromatic dicarboxylic acid diester, or mixture of diesters, in which the glycol is now the ester forming group. In a second step, a selected sequestering agent based on phosphorus is added to the product of the first step. In a third step, the reaction mass of the product of the second step is polycondensed, generally in the presence of a second selected catalyst, to produce the polyester or copolyester. It is also possible to add the second selected catalyst to the first step.

In the process as generally described, the first selected catalyst is preferably zinc, which is added in an amount of about 0.003 to 0.08% (30–80 ppm) by weight based on the amount of the first diester; the second selected catalyst is preferably antimony, which is added in an amount of about 0.01 to 0.05% (100–500 ppm) by weight based on the amount of first diester; and the phosphorus is added in the amount of about 0.001 to about 0.01% (10–100 ppm) by weight based on amount of first diester. The molar ratio of antimony to zinc is from about 1:0.1 to about 1:0.95.

In a preferred embodiment, the invention is directed to the production of polyesters derived from di($C_1$–$C_4$)alkyl terephthalate and similar compounds as described herein.

DETAILED DESCRIPTION OF THE INVENTION

While the following detailed description of the invention is given in terms of the preparation of polyethylene terephthalate, those skilled in the art would be aware that what is described herein is directed the preparation of polyesters from aromatic dicarboxylic acid diesters in general and glycols in general. As used herein the term "polyester" includes copolyester which can be prepared using a plurality of aromatic dicarboxylic acid esters and/or a plurality of glycols as is well known to those skilled in the art.

The objects of the present invention are accomplished and illustrated by a process for the production of PET comprising, in the order as indicated, the steps of (i) reacting di($C_1$–$C_4$)alkyl terephthalate with ethylene glycol to yield bis-(2-hydroxyethyl) terephthalate,
(ii) adding a sequestering agent based on phosphorus and
(iii) polycondensing the bis-(2-hydroxyethyl) terephthalate to produce PET, wherein in step (i) a zinc catalyst is present and in step (iii) additionally an antimony catalyst is present, the amount of catalysts and phosphorus being as follows:

zinc being in the range of from 0.003 to 0.008% by weight (30 to 80 ppm);

phosphorus being in the range of from 0.001 to 0.01% (10 to 100 ppm); and antimony being in the range of from 0.01 to 0.05% by weight (100 to 500 ppm).

In each case, the weights are relative to the weight of the di($C_1$–$C_4$)alkyl terephthalate; the molar ratio of the antimony to the zinc being in the range of from 1:0.95 to 1:0.1, preferably of from 1:0.8 to 1:0.25; and the "value", obtained by multiplying the molar ratio of the phosphorus to the zinc by the molar amount of antimony, is 4 or less. In mathematical terms, the value is defined as:

$$[(\text{moles P/moles Zn}) \times \text{moles Sb}] \leq 4.$$

The di($C_1$–$C_4$)alkyl terephthalates includes dimethyl terephthalate, diethyl terephthalate, dipropyl terephthalate, diisopropyl terephthalate, dibutyl terephthalate, diisobutyl terephthalate, di-sec-butyl terephthalate, and di-tert-butyl terephthalate. The process according to the present invention is also useful in the production of other copolyesters. In such cases, the di($C_1$–$C_4$)alkyl terephthalates are partially or fully replaced by other diesters; for example, by di($C_1$–$C_4$)alkyl isophthalates (e.g. dimethyl isophthalate), naphthalenedicarboxylic acid di($C_1$–$C_4$) alkyl esters (e.g. naphthalene-2,6-dicarboxylic acid dimethyl ester), biphenyl-x,x'-dicarboxylic acid di($C_1$–$C_4$)alkyl esters (e.g. biphenyl-4,4'-dicarboxylic acid dimethyl ester), and similar diesters, or mixtures thereof; and where x and x' are numerals from 1 to 6 denoting the ring locations at which the carboxylic acid groups are located.

Likewise, ethylene glycol may be partially or fully replaced by diethylene glycol, triethylene glycol, polyethylene glycol, propanediol, butanediol, bis-hydroxymethylcyclohexane, and similar glycols, or mixtures thereof.

The zinc catalyst in step (i) is preferably zinc acetate, zinc oxide, zinc sulfide, zinc chloride or zinc bromide. The zinc is preferably present in an amount of about 0.005 to about 0.006% by weight (about 50 to 60 ppm), based on the weight of the di($C_1$–$C_4$)alkyl terephthalate or, more generally, to the weight of the diester mentioned above. If less than 0.003% by weight of zinc are used, this will result in an ester interchange rate which is too slow for practical application or an incomplete ester interchange will be observed. More than 0.08% by weight of zinc will give rise to a PET having too large a number of precipitates. Adding more than 0.08% by weight of zinc also gives no additional benefit to the ester interchange rate.

The catalyst in step (iii) is an antimony compound, preferably antimony trioxide or antimony acetate, antimony trioxide ($Sb_2O_3$) being particularly preferred. The amount of antimony is preferably in the range of from 0.012 to 0.035% by weight (120 to 350 ppm), again based on the weight of the di($C_1$–$C_4$)alkyl terephthalate, or more generally, the diester(s) used in the process. The polycondensation reaction becomes unacceptably slow when less than 120 ppm of antimony are used. Use of more than 500 ppm of Sb could result in a polymer with a significantly increased number of deposits based on these metals. In general, the catalysts should be soluble in the polymer melt. It is also possible, although not required, to add the antimony catalyst to the reaction mixture of step (i). The antimony and zinc ratio given above refers to the amount of metal in the catalyst. Thus, if 300 ppm of antimony is employed, for example, it would not matter if antimony trioxide or antimony acetate were employed so long as the actual amount of antimony metal present is 300 ppm.

In a further, though less preferred, embodiment of the present invention, the antimony catalyst is replaced by a germanium or titanium catalyst, or both. The molar ratio between the germanium and/or titanium and the zinc is preferably the same as disclosed above, although the ratio is obviously not as critical.

Phosphoric acid, phosphorous acid, phosphonic acid and derivatives thereof, alone or in combination, may be employed as sequestering agents. Derivatives of phosphonic acid esters are exemplified by the general formula (alkyl-O)$_2$P(O)-alkylene-CO-O-alkyl. Phosphonoacetic acid triethyl ester ("PEE ester") is a species falling within the scope of the general formula. An example of a phosphoric acid derivative are the "PHM esters" of the general formula P(O)(OR$^1$)$_3$, wherein the three R$^1$ moieties are identical or different, and denote alkyl, hydroxyalkyl or an alkoxylated hydroxyalkyl (the alkyl preferably being methyl, the hydroxyalkyl preferably being hydroxyethyl). Thus, both compounds of trivalent and of pentavalent phosphorus can be used to inactivate the transesterification catalyst.

The amount of phosphorus added refers to the amount of phosphorus in the sequestering agent, regardless of the type of sequestering agent employed. It is preferred to add 0.002 to 0.007% by weight (20 to 70 ppm) of phosphorus, relative to the total weight of the di($C_1$–$C_4$)alkyl terephthalate, or more generally the total weight of the diester(s). The use of less than 10 ppm of phosphorus could lead to an understabilized polymer which would eventually result in an easily degradable polymer with an undesirable color. More than 100 ppm of phosphorus would lead to phosphorus/antimony precipitates or other phosphorus based residues.

The sequestering agent is added when the transesterification reaction is practically completed. The progress of the transesterification reaction can easily be determined by measuring the amount of methanol removed. It is theorized that the highly reactive zinc forms larger particles with the sequestering agent than other conventional catalysts do, therefore minimizing the number of particles formed. The choice of the sequestering agent and the temperature at which it is added during the PET process can further minimize the number of particles formed.

Part of the present invention is also directed to a polyethylene terephthalate, PET, prepared by the novel process disclosed above. A shaped article prepared from this PET is characterized by its having a greatly reduced number of particles formed from the catalyst(s) and sequestering agent (s) employed relative to PET formed by other processes. Preferably the article is a biaxially oriented film. This film shows a greatly reduced number of protrusions on its surface, which makes it particularly useful for the production of video tapes and similar articles. Protrusions, resulting from the presence of particles, will lead to defects in the magnetic coating. This in turn effects the quality of video tape recording and playback.

In addition, the article from the PET prepared by the process according to the present invention can also have the form of fibers, suitable for both textile and technical purposes. These fibers show advantages in processing. In particular, fewer breaks in spinning are observed. The improved mechanical properties are explained by the reduced number of particles in the PET. Likewise, the reduced number of particles can also explain the improved optical properties of the PET articles according to the present invention.

To measure the number of particles present in the polymer, samples were prepared by melting a single PET polymer chip between a glass slide and a cover slip at 330° C., followed by quenching the sample using metal blocks which are at room temperature. In the quenching process, crystallization of the polymer is prevented. The samples were then viewed under a microscope at a 600 fold magnification in a dark field mode. The particles in the polymer were counted using a computerized image analysis system. Using this system, the number, the median particle size and the particle distribution were calculated. The PET produced according to the process of the present invention generally contains less than 400 particles per microgram, preferably less than 200 particles per microgram, and in particular less than 150 particles per microgram.

To measure the number of protrusions present on the surface of a film, PET samples were extruded at a temperature of 290° C. and cast on a metal cooling drum (to prevent crystallization) into a cast sheet having an initial thickness of the cast sheet of 200 $\mu$m. A 125 cm$^2$ sample was then biaxially oriented using a stretching frame set to a temperature of 95° C. and a draw ratio of 3.5:1 in longitudinal direction and of 4.0:1 in transverse direction to achieve a final thickness of 16 $\mu$m. A 78×72 mm sample of this biaxially oriented film was then metallized with 100 nm silver using an Edwards 306 automatic coating system. The metallized sample thus obtained was then viewed under a microscope where protrusions on the surface of the film were identified by interference rings. The total surface area analyzed was 66 mm$^2$, and the results were reported as the number of protrusions per 200 cm$^2$. Based on the number of interference rings observed, the height of the protrusions can be calculated. The protrusions are classified by their size. Protrusions having 3 interference rings (designated as F3) correspond to a height from the film surface of 0.82 $\mu$m. Protrusions of the class F4 correspond to 1.09 $\mu$m, those of F5 to 1.37 $\mu$m and those of F6 to 1.64 $\mu$m. The rating ($K_s$) of the polymer film is based on a weighted average of the protrusions found in each class as follows:

$$K_s = 0.1(F3) + 0.2(F4) + 0.4\ (F5) + 0.8(F6)$$

As the above formula indicates, a relatively small number of protrusions in the classes F5 or F6 increases the $K_s$ value much more than a higher number of small protrusions in the classes F3 or F4. The films according to the present invention are characterized by a $K_s$ value of less than 275, preferably less than 125.

In the following examples the quantities of the metal catalysts in the ester interchange reaction were chosen in such a way as to assure equal reactivity. That is, the theoretically calculated amount of methanol was removed in about the same period of time using the different catalysts. Therefore, an amount of 100 ppm of Mg results in about the same rate of reaction as 70 ppm of Mn or 55 ppm of Zn. The amount of phosphorus-based stabilizer is determined by the amount of ester interchange catalyst and the nature of the stabilizer. In general, the amount is such that the ester interchange catalyst is adequately sequestered. Parts are parts by weight, unless otherwise indicated.

EXAMPLE 1

The ester interchange reaction was carried out in a vessel conventional for this purpose, using 2.3 parts of DMT and 1.67 parts of EG (the molar ratio of the starting materials hence was 1:2.25). At the beginning of the interchange reaction 58 ppm of zinc in the form of zinc acetate were added. The mixture in the vessel was then heated with stirring to 150° C., to give a molten, homogeneous mass. Heating was continued until a temperature of 240° C. was reached. The methanol formed during transesterification was continuously removed to force the reaction to completion. When the reaction was completed, 31 ppm of phosphorus in the form of ethoxycarbonylmethyl phosphonic acid diethyl ester [$(C_2H_5O)_2P(O)$-$CH_2$-$CO$-$OC_2H_5$, also designated as phosphonoacetic acid triethyl ester or "PEE ester"], based on the weight of the DMT, were introduced with stirring into the molten mass. Subsequently, 330 ppm of antimony in the form of $Sb_2O_3$ were added. At this point the mass was transferred to a polycondensation vessel, while passing over a 5 μm nominal filter system.

The mixture was heated in the polycondensation vessel up to a final temperature of 285° C. while the pressure was gradually reduced to a final pressure of 0.5 Torr (=0.65 mbar) thereby initiating the polycondensation reaction. Ethylene glycol which formed during the polycondensation was removed until a polyester having the desired viscosity was achieved. At this point the vessel was pressurized with nitrogen and the batch was extruded into a water trough and chipped.

Typical polymer properties such as solution viscosity, amount of carboxyl end group (CEG) in microequivalents per gram of polymer, mole percentage of diethylene glycol (DEG) present in the polymer and color were measured on the chipped samples. The solution viscosity is a specific viscosity which was measured at 25° C. with dichloroacetic acid as solvent, using a Schott-Ubbelohde viscometer. The numbers were calculated as follows: {[(time of efflux of PET solution)/(time of efflux of solvent)]−1}×1000. The PET solution contained 1 percent of PET, i.e. 1.56 g of PET were dissolved in 100 ml of dichloroacetic acid. The polymer color values were measured in accordance with ASTM standard E308-85 ($L_{ab}$-system) on the polymer chips, using the CR-310 Chromometer from Minolta (b* represents the yellowness number; L* indicates the brightness). The results of the microscopic analysis of particles in the PET sample are also listed below as number of particles per microgram of polymer chip.

TABLE 1

| solution viscosity | CEG [μequiv./g] | DEG [%] | L*/b* | $K_s$ | Particles per μg |
|---|---|---|---|---|---|
| 773 | 23.3 | 0.76 | 62.9/10 | 242 | 113 |

The data indicates that the number of particles present is quite small. At the same time, the film produced from this PET had an acceptable surface structure.

EXAMPLE 2

(Comparison)

Example 1 was repeated, with a difference being that the 58 ppm of zinc were replaced by 100 ppm of magnesium in the form of magnesium acetate. Further, in order to sequester this catalyst, the 31 ppm of phosphorus as disclosed in Example 1 were replaced by 128 ppm of phosphorus (in the form of phosphorous acid). The properties of the polymer thus obtained with this PET are summarized below.

TABLE 2

| solution viscosity | CEG [μequiv./g] | DEG [%] | L*/b* | $K_s$ | Particles per μg |
|---|---|---|---|---|---|
| 768 | 31.7 | 0.51 | 59/6.2 | 364 | 583 |

The data indicates that the number of particles per microgram of PET resin is much higher than in Example 1. This fact also results in a higher $K_s$ value than in Example 1, indicating there was a considerable number of unwanted protrusions in the PET film.

EXAMPLE 3

(Comparison)

Example 1 was repeated, with a difference being that the 58 ppm of zinc were replaced by 73 ppm of manganese in the form of manganese acetate. Further, in order to sequester this catalyst, the 31 ppm of phosphorus as disclosed in Example 1 were replaced by 43 ppm of phosphorus (again in the form of phosphorous acid). The properties of a film obtained with this PET are summarized below.

TABLE 3

| solution viscosity | CEG [μequiv./g] | DEG [%] | L*/b* | $K_s$ | Particles per μg |
|---|---|---|---|---|---|
| 750 | 22.9 | 0.59 | 59/6.6 | 485 | 1009 |

The data in this example indicates that the maganese catalyst gave results which were was even worse than those obtained using the magnesium catalyst of Example 2.

EXAMPLE 4

Example 1 was repeated, with a difference being that 52 ppm instead of 58 ppm of zinc in the form of zinc acetate were employed. Further, in order to sequester this catalyst, 60 ppm instead of 31 ppm of phosphorus (in the form of "PHM ester" which is phosphoric acid methyl hydroxyethyl esters, wherein the hydroxyethyl may be further ethoxylated) were added. The relative amount of antimony (in the form of $Sb_2O_3$) was reduced from 330 ppm to 160 ppm. From these relative amounts, the value [(moles P/moles Zn)×moles Sb)] can be calculated as being 3.2. The properties of polymer obtaining using this PET are summarized below.

TABLE 4

| solution viscosity | CEG [μequiv./g] | DEG [%] | L*/b* | $K_s$ | Particles per μg |
|---|---|---|---|---|---|
| 770 | 23.9 | 0.97 | 65.3/9.7 | 30 | 103 |

The number of particles in the PET is unexpectedly small. Consequently, the surface of the PET film is very smooth.

EXAMPLE 5

(Comparison)

Example 1 was repeated with a difference being that 52 ppm instead of 58 ppm of zinc in the form of zinc acetate were employed. Further, in order to sequester this catalyst, 60 ppm instead of 31 ppm of phosphorus (again in the form of PHM ester) were added. From these relative amounts, the value [(moles P/moles Zn)×moles Sb)] can be calculated as being 6.6. The properties of polymer obtained using this PET are summarized below.

TABLE 5

| solution viscosity | CEG [µequiv./g] | DEG [%] | L*/b* | $K_s$ | Particles per µg |
|---|---|---|---|---|---|
| 774 | 21.0 | 0.96 | 65.4/10.8 | 1091 | 165 |

As is shown in Table 5, the PET film contained an unacceptably high number of protrusions due to the higher amounts of P and Sb relative to Zn as calculated by the formula [(moles P/moles Zn)×moles Sb)].

EXAMPLE 6

(Comparison)

Example 1 was repeated, with a difference being that the 58 ppm of zinc were replaced by 100 ppm of magnesium in the form of magnesium acetate. In order to sequester this catalyst, 95 ppm of phosphorus (in the form of a 1:1 (w/w) mixture of phosphoric acid monoethyl ester and phosphoric acid diethyl ester, also known under the trivial name "ethyl acid phosphate" or "EAP") were added. The relative amount of antimony (in the form of antimony trioxide) was 180 ppm. The properties of the polymer using this PET are summarized below:

TABLE 6

| solution viscosity | CEG [µequiv./g] | DEG [%] | L*/b* | $K_s$ | Particles per µg |
|---|---|---|---|---|---|
| 714 | 17.6 | 1.02 | 64.4/2.2 | 424 | 225 |

The results show that the $K_s$ value of a film produced using this PET was too high.

EXAMPLE 7

(Comparison)

Example 1 was repeated, with a difference being that the 58 ppm of zinc were replaced by 100 ppm of magnesium in the form of magnesium acetate. Further, in order to sequester this catalyst, 95 ppm of phosphorus (again in the form of EAP) were added. The properties of the polymer obtained using this PET are summarized below:

TABLE 7

| solution viscosity | CEG [µequiv./g] | DEG [%] | L*/b* | $K_s$ | Particles per µg |
|---|---|---|---|---|---|
| 763 | 56.0 | 1.00 | 58.9/3.1 | 515 | 1080 |

The number of particles per microgram of resin as well as a PET film prepared according to this Example results in an unacceptably high number of protrusions.

It is to be understood that the invention as described by the examples given herein are not to be taken as limiting the invention. Various modifications to what is described herein will be apparent to those skilled in the art without departing from the spirit or scope of the invention as defined by the attached claims.

We claim:
1. A process for the production of polyethylene terephthalate comprising the steps of
   (i) reacting di($C_1$–$C_4$)alkyl terephthalate with ethylene glycol to yield bis-(2-hydroxyethyl) terephthalate,
   (ii) adding a sequestering agent based on phosphorus and
   (iii) polycondensing the bis-(2-hydroxyethyl) terephthalate to produce PET,
wherein in step (i) a zinc catalyst is present, and in step (iii) an antimony catalyst is additionally present, the amount of:
   zinc being in the range of from 0.003 to 0.008% by weight,
   phosphorus being in the range of from 0.001 to 0.01%,
   antimony being in the range of from 0.01 to 0.05% by weight; and
wherein in each case the amount is relative to the weight of the di($C_1$–$C_4$)alkyl terephthalate, the molar ratio of the antimony to the zinc being in the range of from 1:0.95 to 1:0.1 and the value, obtained by multiplying the molar ratio of the phosphorus to the zinc by the molar amount of antimony, is 4 or less.

2. The process as claimed in claim 1, wherein the molar ratio of the antimony to the zinc is in the range of from 1:0.8 to 1:0.25.

3. The process as claimed in claim 1, wherein the terephthalate is dimethyl terephthalate, diethyl terephthalate or dipropyl terephthalate.

4. The process as claimed in claim 1, wherein the zinc catalyst is selected from the group consisting of zinc acetate, zinc oxide, zinc sulfide, zinc chloride and zinc bromide.

5. The process as claimed in claim 1, wherein the zinc is present in step (i) in an amount of 0.005 to 0.006% by weight, based on the weight of the di($C_1$–$C_4$)alkyl terephthalate.

6. The process as claimed in claim 1, wherein the sequestering agent based on phosphorus is selected from the group consisting of phosphoric acid, phosphorous acid, phosphonic acid and derivatives thereof.

7. The process as claimed in claim 1, wherein the phosphorus in the sequestering agent is present in an amount of from 0.002 to 0.007% by weight (20 to 70 ppm), relative to the weight of the di($C_1$–$C_4$)alkyl terephthalate.

8. The process as claimed in claim 1, wherein the catalyst in step (iii) is antimony trioxide or antimony acetate.

9. The process as claimed in claim 1, wherein the amount of antimony present in step (iii) is in the range of from 0.012 to 0.035% by weight, based on the weight of di($C_1$–$C_4$)alkyl terephthalate.

10. A polyethylene terephthalate produced by the process as claimed in claim 1.

11. The polyethylene terephthalate as claimed in claim 10, said polyethylene terephthalate containing less than 400 particles per microgram.

12. The polyethylene terephthalate as claimed in claim 11, said polyethylene terephthalate containing less than 200 particles per microgram.

13. The polyethylene terephthalate as claimed in claim 12, said polyethylene terephthalate containing less than 150 particles per microgram.

14. A shaped article made from the polyethylene terephthalate as claimed in claim 11.

15. A shaped article made from the polyethylene terephthalate as claimed in claim 12.

16. A shaped article made from the polyethylene terephthalate as claimed in claim 13.

17. The shaped article as claimed in claim 12, said article having the form of a biaxially oriented film which has a $K_s$ value of less than 275, preferably less than 125.

18. A process for the production of polyesters, said process comprising the steps of:
   (i) reacting a first selected aromatic dicarboxylic acid diester, or mixture of such diesters, in an exchange reaction with a glycol having a plurality of hydroxyl groups to yield a second aromatic dicarboxylic acid diester, or mixture of diesters, in which said glycol is the ester forming group,
   (ii) adding a sequestering agent based on phosphorus, and
   (iii) polycondensing said second diester of step (ii) to produce a polyester;
wherein in step (i) at least a zinc catalyst is present and in step (iii) an antimony catalyst is additionally present, the amounts of said catalysts and phosphorus being:
   zinc being in the range of from 0.003 to 0.008% by weight,
   phosphorus being in the range of from 0.001 to 0.01% by weight, and
   antimony being in the range of from 0.01 to 0.05% by weight;
wherein in each case the amount of each catalyst and phosphorus is relative to the weight of the first diester, the molar ratio of antimony to zinc being in the range from 1:0.1 to 1:0.95;
wherein the first aromatic dicarboxylic acid diester is selected from the group consisting of di($C_1$–$C_4$)alkyl terephthalates, di($C_1$–$C_4$)alkyl isophthalates, napthalenedicarboxylic acid di($C_1$–$C_4$)alkyl esters, biphenyl x,x' - dicarboxylic acid diesters where x and x' are numerals from 1 to 6 denoting the ring positions at which the carboxylic acid groups are located, and similar diesters or mixtures thereof; and
wherein said glycol is selected from the group consisting of ethylene glycol, diethylene glycol, propanediol, butanediol, bis-hydroxymethylcyclohexane, and similar glycols or mixtures thereof.

19. The process according to claim 18 wherein the first diester is a di($C_1$–$C_4$)alkyl terephthalate.

20. The process according to claim 18 wherein the zinc catalyst is selected from the group consisting of zinc acetate, zinc oxide, zinc chloride and zinc bromide.

21. The process according to claim 18 wherein the phosphorus sequestering agent is selected from the group consisting of phosphoric acid, phosphorus acid, phosphonic acid, and derivatives thereof.

22. The process according to claim 18 wherein the antimony catalyst is selected from the group consisting of antimony trioxide and antimony acetate.

23. A polyester film made using the polyester material produced according to claim 18.

24. A polymer comprising a polyester having less than 400 particles per microgram polymer, said particles arising from combination of one or a plurality of selected catalysts and a sequestering agent used during the preparation of said polymer;
wherein
   (A) said polymer is a polyester comprising
      (1) a dicarboxylic acid moiety selected from the group consisting of di($C_1$–$C_4$)alkyl terephthalates, di($C_1$–$C_4$)alkyl isophthalates, napthalenedicarboxylic acid di($C_1$–$C_4$)alkyl esters, biphenyl x,x'- dicarboxylic acid diesters where x and x' are numerals from 1 to 6 denoting the ring positions at which the carboxylic acid groups are located, and similar diesters or mixtures thereof and
      (2) a glycol selected from the group consisting of ethylene glycol, diethylene glycol, propanediol, butanediol, bis-hydroxymethylcyclohexane, and similar glycols or mixtures thereof;
   (B) said catalysts are selected from the group consisting of zinc acetate, zinc oxide, zinc sulfide, zinc chloride, zinc bromide, antimony trioxide and antimony acetate; and
   (C) said sequestering agent is a phosphorus compound selected from the group consisting of phosphoric acid, phosphorus acid, phosphonic acid, and derivatives thereof.

25. A polymer comprising a polyethylene terephthalate having less than 400 particles per microgram polymer, said particles arising from a combination of one or a plurality of selected catalysts and a sequestering agent used during the preparation of said polymer;
wherein:
   (A) said polymer is a terephthalate comprising:
      (1) a di($C_1$–$C_4$)alkyl terephthalate and
      (2) ethylene glycol and substituted ethylene glycols or mixtures thereof;
   (B) said catalysts are selected from the group consisting of zinc acetate, zinc oxide, zinc sulfide, zinc chloride, zinc bromide, antimony trioxide and antimony acetate; and
   (C) said sequestering agent is a phosphorus compound selected from the group consisting of phosphoric acid, phosphorus acid, phosphonic acid, and derivatives thereof.

* * * * *